Oct. 19, 1926.

C. W. BASSETT 1,603,892

LUBRICATING DEVICE

Filed April 30, 1925

INVENTOR
CYRUS W. BASSETT
BY
ATTORNEY

Patented Oct. 19, 1926.

1,603,892

UNITED STATES PATENT OFFICE.

CYRUS WHITE BASSETT, OF MAPLEWOOD, NEW JERSEY, ASSIGNOR TO ELEVATOR SUPPLIES COMPANY, INC., A CORPORATION OF NEW JERSEY.

LUBRICATING DEVICE.

Application filed April 30, 1925. Serial No. 26,910.

This invention relates to new and useful improvements in lubricating devices, and it pertains more particularly to lubricators especially adapted for applying lubricant to elevator guide rails.

In lubricating devices generally of this type, there is a lubricant receptacle suitably carried by each of the guide rails, means being provided for feeding the lubricant from the receptacles to the guide rails.

In lubricators of this type various schemes have been devised for regulating the flow of lubricant from the lubricant receptacle to the guide rail, and it is one of the primary objects of the present invention to provide a new and improved regulating means for such devices.

These lubricators as generally constructed also include three or more separate means for conveying the lubricant from the lubricant receptacle to the guide rail, and it is a further object of the present invention to provide a regulating means which is so constructed as to simultaneously operate upon all of the lubricant feeding elements, thus greatly reducing the number of parts over constructions where regulating means common to each lubricant conveying means is employed.

It is a further object of the invention to provide a lubricator for guide rails of elevators which is easily attached to the elevator guide rail and readily accessible for manipulation thereof.

With the above and other objects in view, reference is had to the accompanying drawings in which—

Figure 1:
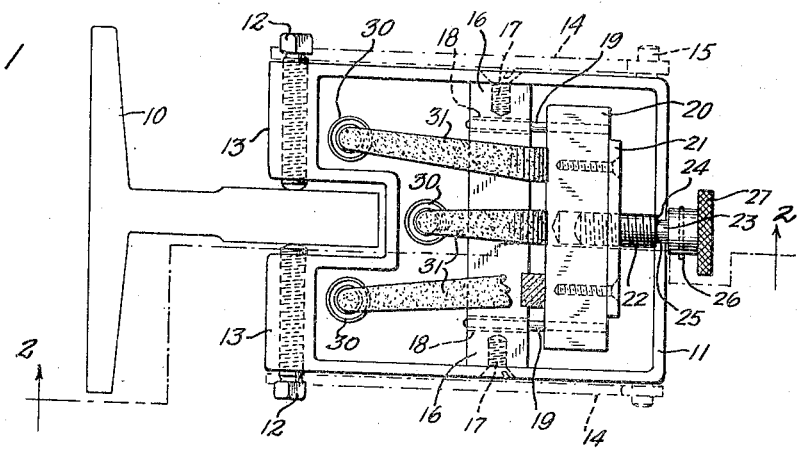
Figure 2:
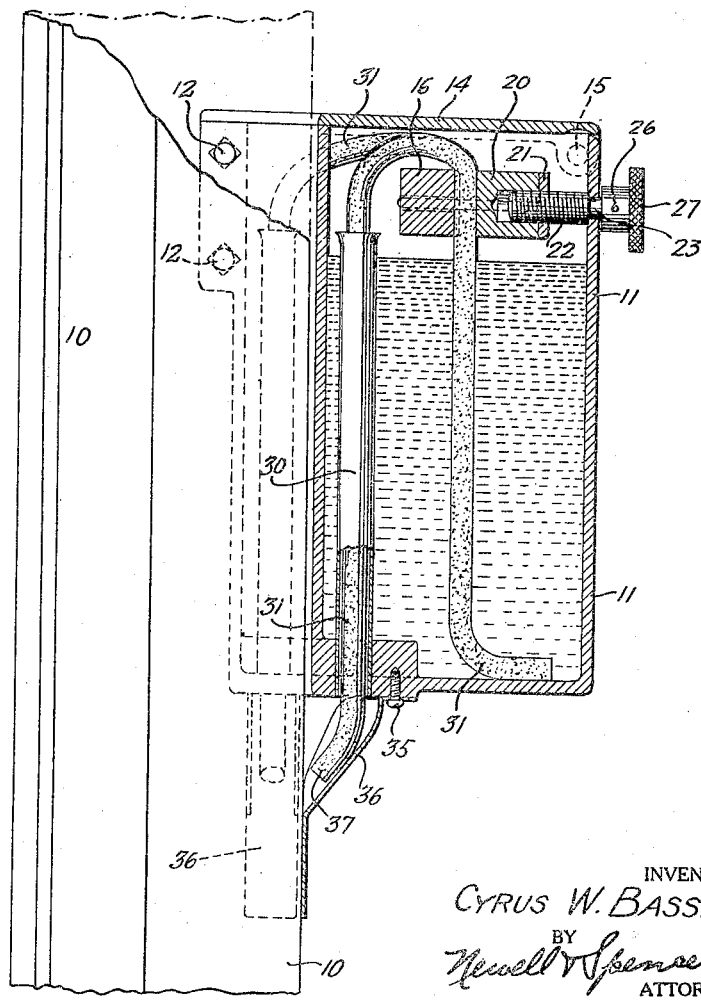

Fig. 1 is a top plan view of a lubricating device constructed in accordance with the present invention and shown as secured to an elevator guide rail near the upper end thereof; and Fig. 2 is a vertical sectional view of the lubricator taken on the line 2—2 of Fig. 1.

The reference numeral 10 designates an elevator guide rail which, in the present illustration is of T-beam shape.

Carried by the elevator guide rail there is a lubricant receptacle 11, and this lubricant receptacle 11 is secured to the guide rail 10 by means of bolts 12, which bolts pass through the thickened wall 13 of the lubricant receptacle, and engage the T-beam as more clearly shown in Fig. 1.

The lubricant receptacle 11 has a hinged cover 14 pivotally connected thereto as at 15 and said cover is adapted to swing to a position which will give access to the interior of the lubricant receptacle 11.

Carried by the lubricant receptacle upon the interior thereof and located near its upper end there is a bridge block 16, preferably removably secured in the lubricant receptacle 11 by means of screws 17. The bridge block 16 is provided with a plurality of openings 18, of which there are preferably 2, and adapted to be received within said openings 18 there are pins 19 carried by a movable compression block 20. This movable compression block 20 has secured to its outer face a plate 21, and having threaded engagement with said plate 21, there is a screw 22. The screw 22 has a reduced portion 23 forming a shoulder 24, and this reduced portion 23 provides the means for mounting the screw in an opening 25 in one of the side walls of the lubricant receptacles 11. Secured to the reduced portion 23 of the screw 22 preferably by pin 26, there is a thumb wheel 27, by means of which the screw 22 may be rotated.

The aforementioned construction provides a bride block in which is suitably mounted a movable compression block, together with means for moving the compression block, the operation of which will be hereinafter more specifically referred to. Mounted in the lubricant receptacle 11, and extending vertically thereof, there are preferably three tubes 30, and passing through each of these tubes 30, there is a lubricant conveying means in the form of a wick 31 of felt or other suitable absorbent material. These lubricant conveying elements pass over the bridge block 16, and between it and the compression block 20, in such a manner that, as the compression block 20 is moved relatively to the bridge block 16, the lubricant conveyors will be placed under more or less compression for the purpose of controlling the flow of the lubricant therethrough.

Secured as at 35 to the outer face of the lower wall of the lubricant receptacle 11 adjacent each tube 30, there is an oil dripper 36 in which the lower end 37 of its respective lubricant conveyor is positioned in order to discharge the lubricant to the oil dripper, and from thence to the elevator guide rail.

The device operates in the following manner:

The lubricant is conveyed by the elements 31 from the lubricant receptacle 11 and deposited upon the oil drippers to which the lubricant conveyors extend. If too much lubricant is fed by the lubricant conveyors 31, the screw 22 is operated by its thumb nut 27, to move the compression block in a direction towards the bridge block 16, and thus place the several lubricant conveyors 31 under compression to retard the flow of the lubricant therethrough. By adjustment of the compression block 20, the rate of feed of the lubricant through the lubricant conveyors 31 may be regulated to a nicety, and thus the lubricant may be fed to the guide rails in any desired quantity.

Having thus described the invention, what is claimed as new is:

1. In a guide rail lubricator, a lubricant receptacle, means for securing the same to an elevator guide rail, a bridge block supported by two of the side walls of said lubricant receptacle, a plurality of lubricant conveying elements extending over said bridge block and projecting from the receptacle to the point to be lubricated, and means for simultaneously placing said lubricant conveying elements under compression to control the flow of lubricant therethrough.

2. In a guide rail lubricator, a lubricant receptacle, means for securing same to an elevator guide rail, a bridge block supported by two of the side walls of said lubricant receptacle, a plurality of lubricant conveying elements extending over said bridge block and projecting from the receptacle to the point to be lubricated, and means for simultaneously placing said lubricant conveying elements under compression to control the flow of lubricant therethrough, said means comprising a pressure applying block supported from the bridge block and one of the side walls of the lubricant receptacle, and means for moving said pressure applying block toward and away from said bridge block.

3. In a lubricating device including lubricant feeding elements, means for regulating the flow of lubricant through said lubricant feeding elements, said means comprising a bridge block over which said lubricant feeding elements pass, said bridge blocking having openings therein, a compression block for placing said lubricant feeding means under pressure, guide pins carried by said compression block, and having sliding movement in said openings, and means for moving said compression block toward and away from the bridge block.

4. In a lubricating device including lubricant feeding elements, means for regulating the flow of lubricant through said lubricant feeding elements, said means comprising a bridge block over which said lubricant feeding elements pass, said bridge block having openings therein, a compression block, guide pins carried by said compression block and having sliding movement in said openings, and means for moving said compression block toward and away from the bridge block, said means comprising a screw threaded member having threaded engagement with said compression block, and revolubly mounted in a portion of the lubricator.

5. In a lubricating device, a lubricant receptacle, a bridge block extending across said lubricant receptacle, a plurality of lubricant conveying means extending from the lower portion of the lubricant receptacle to a point exteriorly thereof and overlying said bridge block, and compression means arranged to simultaneously compress said plurality of lubricant conveying means between itself and said bridge block for regulating the flow of lubricant through the lubricant conveying means.

Signed at New York city, N. Y., this 28th day of April 1925.

CYRUS WHITE BASSETT.